US012360548B2

(12) United States Patent
Arnold et al.

(10) Patent No.: US 12,360,548 B2
(45) Date of Patent: Jul. 15, 2025

(54) REFERENCE VOLTAGE GENERATION WITHIN A TEMPERATURE RANGE

(71) Applicant: TEXAS INSTRUMENTS INCORPORATED, Dallas, TX (US)

(72) Inventors: Annabelle Arnold, Zolling (DE); Konrad Wagensohner, Mauern (DE); Markus Georg Rommel, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 217 days.

(21) Appl. No.: 17/976,516

(22) Filed: Oct. 28, 2022

(65) Prior Publication Data

US 2024/0143012 A1 May 2, 2024

(51) Int. Cl.
*G05F 3/26* (2006.01)
*G05F 3/24* (2006.01)
*G05F 3/30* (2006.01)

(52) U.S. Cl.
CPC ................ *G05F 3/262* (2013.01); *G05F 3/24* (2013.01); *G05F 3/26* (2013.01); *G05F 3/30* (2013.01)

(58) Field of Classification Search
CPC ..... G05F 3/24; G05F 3/26; G05F 3/30; G05F 3/262
See application file for complete search history.

(56) References Cited

U.S. PATENT DOCUMENTS 7,113,025 B2 * 9/2006 Washburn ................. G05F 3/30 327/539
7,576,599 B2 * 8/2009 Huang ...................... G05F 3/30 327/539
8,072,259 B1 12/2011 Isik
9,069,367 B2 * 6/2015 Nag .......................... G05F 3/30
10,234,889 B2 * 3/2019 Arnold ...................... G05F 3/30
2009/0146730 A1 * 6/2009 Chen ......................... G05F 3/30 327/539

(Continued)

FOREIGN PATENT DOCUMENTS

EP 2557472 B1 * 4/2017 .............. G05F 3/30

OTHER PUBLICATIONS

International Search Report mailed Feb. 12, 2024.

*Primary Examiner* — Gary A Nash
(74) *Attorney, Agent, or Firm* — Valerie M. Davis; Frank D. Cimino

(57) ABSTRACT

A circuit may include a current generator coupled to a first voltage source. The current generator may be configured to generate a first current, and mirror the first current into a second current and a third current. The circuit may include a proportional to absolute temperature ("PTAT") voltage generator coupled to the current generator and a second voltage source. The PTAT voltage generator may be configured to receive the second current from the current generator, and generate a third voltage based on the second current. The circuit may include a complementary to absolute temperature ("CTAT") voltage generator coupled to the current generator and to the PTAT voltage generator. The CTAT voltage generator may be configured to receive the first current and the third current from the current generator, and generate a reference voltage based on the first current, the second current, and the third voltage.

16 Claims, 3 Drawing Sheets

(56) References Cited

U.S. PATENT DOCUMENTS

| | | | | |
|---|---|---|---|---|
| 2011/0193544 | A1* | 8/2011 | Iacob | G05F 3/242 323/315 |
| 2013/0293215 | A1* | 11/2013 | Lym | G05F 3/30 323/313 |
| 2014/0091780 | A1* | 4/2014 | Hu | G05F 3/30 323/314 |

* cited by examiner

REFERENCE VOLTAGE GENERATION WITHIN A TEMPERATURE RANGE

BACKGROUND

A reference voltage ("VREF") acts as a precise analog metering against which an incoming analog signal is compared (e.g., in an analog-to-digital Converter ("ADC")) or an outgoing analog signal is generated (e.g., in a digital-to-analog Converter ("DAC")). A device may use the VREF as a reference value to determine whether an action should be performed. The use of complex circuits configured to generate the VREF may be limited by temperature changes and fabrication process variation in the circuit. These circuits may fail to deliver an approximately constant voltage (e.g., within a predetermined margin) for the VREF at relatively low temperatures (e.g., below −20 degrees Celsius) and/or at relatively high temperatures (e.g., over 150 degrees Celsius).

SUMMARY

In one or more embodiments, a circuit includes a current generator coupled to a first voltage source. The current generator is configured to generate a first current, and mirror the first current into a second current and a third current. The circuit includes a proportional to absolute temperature ("PTAT") voltage generator coupled to the current generator and a second voltage source. The PTAT voltage generator is configured to receive the second current from the current generator, and generate a third voltage based on the second current. The circuit includes a complementary to absolute temperature ("CTAT") voltage generator coupled to the current generator and to the PTAT voltage generator. The CTAT voltage generator is configured to receive the first current and the third current from the current generator, and generate a reference voltage based on the first current, the second current, and the third voltage.

DETAILED DESCRIPTION

Figure 1:
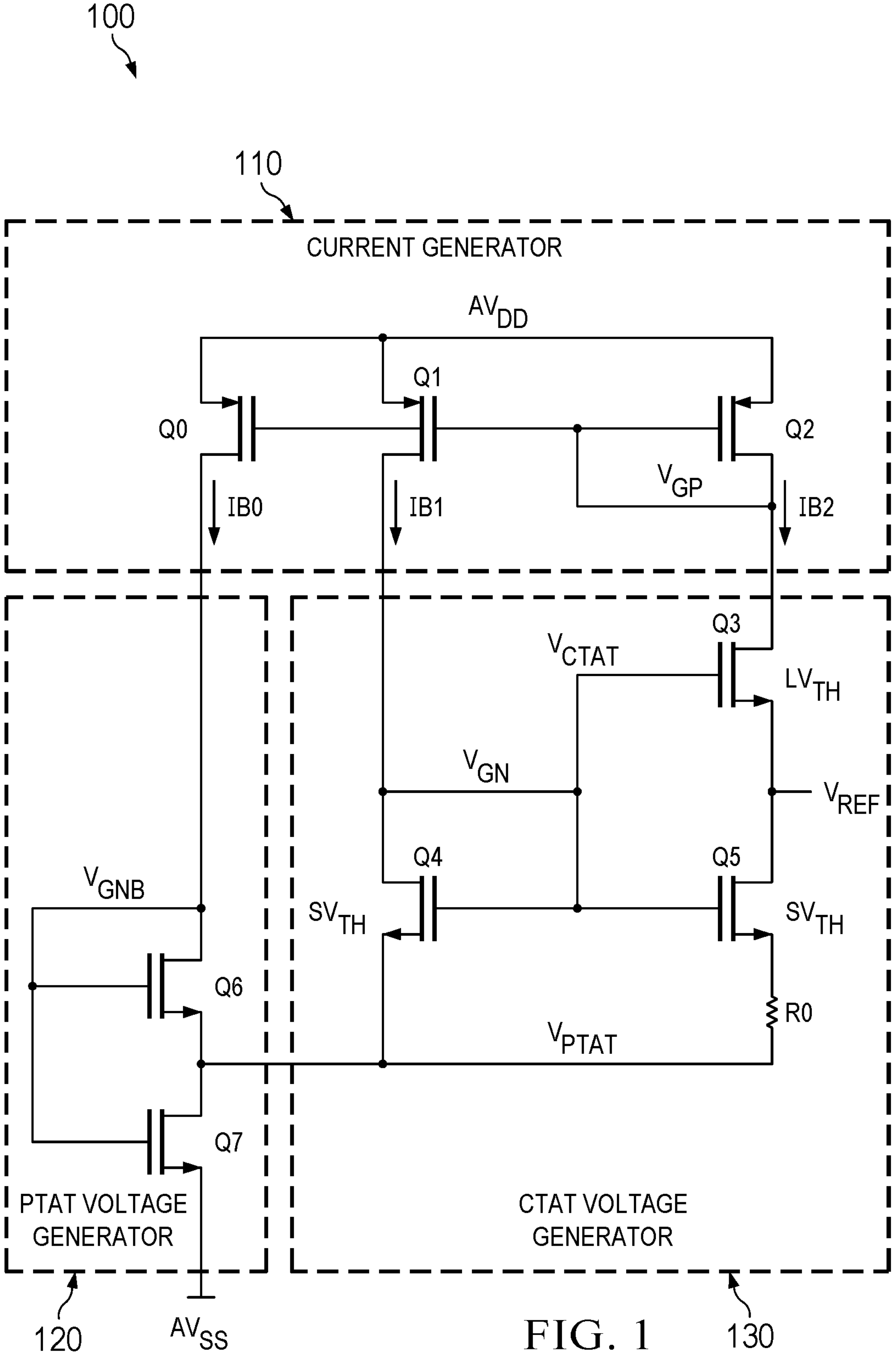
FIG. 1 is a circuit diagram illustrating a voltage reference circuit, in accordance with one or more embodiments.

The same reference number is used in the drawings for the same or similar (either by function and/or structure) features.

In one or more embodiments, a voltage reference circuit is configured to generate an approximately constant voltage (e.g., +/−10 parts per million ("ppm") from a target voltage) of a reference voltage ("VREF") that remains relatively constant through a wide temperature range (e.g., from −20 degrees Celsius to 150 degrees Celsius). In some embodiments, the reference voltage circuit generates the VREF at the approximately constant value within a particular temperature range. The particular temperature range may be the range specified above or between the temperatures of −55 degrees Celsius and 180 degrees Celsius, inclusive. Boundaries for the particular temperature range may be controlled using a trim controller configured to adjust the voltage of the VREF in case of fabrication process variations.

In the voltage reference circuit described herein, the VREF is generated based on a complementary to absolute temperature ("CTAT") voltage controlled by a current generator and a proportional to absolute temperature ("PTAT") voltage generated by a voltage generator. The CTAT voltage is a voltage with a negative temperature coefficient generated using a transistor with a low threshold voltage ("LVth") and a transistor with a standard threshold voltage ("SVth") that are biased by bias currents having a same value. The PTAT voltage is a voltage with a positive temperature coefficient generated using, for example, two transistors connected in series with their gates connected to the drain of the upper one, both are also biased by the same bias current. The threshold voltage is the minimum gate-to-source voltage VGS (th) that is needed to create a conducting path between a source and a drain in a transistor. By using suitable transistor types, the difference of a larger and a smaller threshold voltage can be made such that it has the same temperature coefficient as a single threshold voltage but a smaller magnitude. The bias current is mirrored by the current generator and provided to the voltage generator and the CTAT voltage generator. In turn, the voltage generator produces the PTAT voltage which is a reference ground of the CTAT voltage generator. To generate the VREF, the CTAT voltage generator generates the CTAT voltage based on the bias current controlled by the current generator and adds the and the PTAT to result in an approximately zero temperature coefficient ("TC") voltage (e.g., a stable VREF). The zero TC voltage is generated based on (i.e., as a sum of) a threshold voltage difference between the two transistors biased with the bias current and a PTAT voltage between two other transistors having a positive TC. In some embodiments, the voltage reference circuit may include a trim controller that adjusts the VREF (up or down) by modifying the TC when the TC does not add up to zero. The TC may be a value other than zero based on a manufacturing process variations of all transistors.

In some embodiments, the voltage reference circuit provides the VREF as a reference value to a Power on Reset (POR) stage or start-up stage to an electronic device. The electronic device may be, for example, a Buck Direct Current (DC)/DC converter that uses the VREF to determine a precise voltage available for use from a power supply. The DC/DC converter may compare the VREF to the precise voltage until the voltages are equal. After the voltages are equal, the DC/DC converter may be triggered to use power provided from the power supply to perform voltage conversion operations.

In one example, the DC/DC converter is an isolated voltage converter, which may include a transformer as an isolation barrier. The VREF defines a voltage from the power supply at which the DC/DC converter may start providing power from a primary coil to a secondary coil. As described above, the voltage reference circuit maintains an approximately constant value of VREF within the particular temperature range. The voltage reference circuit may generate the VREF while minimizing electromagnetic emissions caused by a switch network in the DC/DC converter. Such DC/DC converters and the voltage reference circuit described herein may be used in a variety of applications such as in vehicles (e.g., electric vehicles).

FIG. 1 is a circuit diagram of a voltage reference circuit 100 in accordance with one or more embodiments. The voltage reference circuit 100 is configured to generate a VREF that is relatively unaltered (e.g., +/−10 parts per million ("ppm") from a target voltage) by temperature changes in the voltage reference circuit 100 within a particular temperature range. The temperature may change in the voltage reference circuit 100 during normal operations. The particular temperature range may be between −55 degrees Celsius and 180 degrees Celsius, inclusive.

In some embodiments, the voltage reference circuit 100 includes a current generator 110, a proportional to absolute temperature ("PTAT") voltage generator 120, and a complementary to absolute temperature ("CTAT") voltage generator 130. The voltage reference circuit 100 receives at least two voltages from two corresponding voltage sources and generates the VREF as an output. A first voltage source provides a voltage AVDD to the voltage reference circuit 100 by the current generator 110. A second voltage source provides a voltage AVSS to the voltage reference circuit 100 by the PTAT voltage generator 120. AVDD is a voltage that is referenced with respect to AVSS.

The current generator 110 includes three transistors Q0-Q2 coupled to the voltage AVDD. The transistor Q2 may generate a bias current IB2 based on a reference voltage of the voltage AVDD. Transistors Q0 and Q1 are configured to mirror the bias current IB2 in a bias current IB0 and a bias current IB1. In some embodiments, the three transistors Q0-Q2 are p-channel field effect transistors ("PFETs") with their respective sources (e.g., one of their current terminals) coupled to one another and the voltage AVDD. The respective gates (e.g., the control terminal) of the three transistors Q0-Q2 are coupled to one another. A drain of the transistor Q0 is coupled to the PTAT voltage generator 120. Drains of the transistor Q1 and the transistor Q2 are coupled to the CTAT voltage generator 130. The bias current IB2 is generated by a positive gate voltage VGP as the transistor Q2 is biased.

The PTAT voltage generator 120 may include two transistors Q6 and Q7. Transistors Q6 and Q7 are n-channel field effect transistors ("NFETs") with their respective gates coupled to one another and the current generator 110. As described above, the PTAT voltage generator 120 receives the bias current IB0 from the transistor Q0. A drain and a gate of the transistor Q6 are coupled to one another and the drain of the transistor Q0 in the current generator 110. A source of the transistor Q6 is coupled to a drain of the transistor Q7. The gate of the transistor Q7 is coupled to the drain and the gate of the transistor Q6 and the drain of the transistor Q0 in the current generator 110. At this coupling and with transistors Q6 and Q7 biased in weak inversion, the PTAT voltage generator 120 generates the PTAT voltage (e.g., voltage PTAT ("VPTAT")).

The CTAT voltage generator 130 in this example includes three transistors Q3-Q5 and a resistor R0. The three transistors Q3-Q5 are NFETs configured to generate the VREF. The transistor Q3 is a low threshold voltage ("LVth") transistor. The transistors Q4 and Q5 are standard threshold voltage ("SVth") transistors. The threshold voltage of the SVth transistor is higher than the threshold voltage of the LVth transistor. As described above, the threshold voltage is the minimum gate-to-source voltage VGS (th) that is used to create a conducting path between a source and a source in a transistor. The drain of transistor Q3 is coupled to the drain of the transistor Q2 in the current generator 110. The gate of the transistor Q3 is coupled to the drain of the transistor Q1 in the current generator 110. The source of the transistor Q3 is coupled to a drain of the transistor Q5. The drain and a gate of the transistor Q4 are coupled to the drain of the transistor Q1 in the current generator 110 and the gate of the transistor Q3. The source of the transistor Q4 is coupled to the source of the transistor Q6 and the drain of the transistor Q7 in the PTAT voltage generator 120. The gate of the transistor Q5 is coupled to the drain and the gate of the transistor Q4 and the gate of the transistor Q3. A source of the transistor Q5 is coupled to a terminal of the resistor R0. Another terminal of the resistor R0 is coupled to the source of the transistor Q6 and the drain of the transistor Q7 in the voltage generator 120 and the source of the transistor Q4.

In some embodiments, the CTAT voltage generator 130 generates the VREF by combining the CTAT2 voltage and the CTAT1 voltage (e.g., Voltages CTAT ("VCTAT")) generated using the current received by the current generator 110 and the PTAT voltage generated by the PTAT voltage generator 120. The CTAT voltage is a voltage having a negative temperature 4300-1075M 6 coefficient generated using the transistor Q4 with the SVth and the Q3 with the LVth that are biased by the bias current IB2. The PTAT voltage is a voltage having a positive temperature coefficient generated using the transistor Q5 with the SVth that is also biased by the bias current IB2. The bias current IB1 is mirrored by the transistor Q1 from the transistor Q2 in the current generator 110 and provided to the PTAT voltage generator 120 and the CTAT voltage generator 130. In turn, the PTAT voltage generator 120 generates the PTAT voltage which is a reference ground of the CTAT voltage generator 130. To generate the VREF, the CTAT voltage generator 130 generates the CTAT voltage based on the bias current controlled by the current generator 110 and combines a difference of the gate-to-source voltages VGS(Q4)-VGS (Q5) as the CTAT voltage and the PTAT voltage at the coupling of the source of the transistor Q6 and the source of the transistor Q7. At this coupling in the circuit, the temperature coefficient ("TC") is approximately zero, causing the VREF to be a relatively constant voltage (e.g., a stable VREF). The approximately zero TC is generated by combining the negative TC of the CTAT provided by the source of the transistor Q3 and the positive TC of the PTAT provided by the drain of the transistor Q5. The combination of the different TCs occurs when the threshold voltage of the transistor Q3 is smaller than the threshold voltage of the transistor Q4.

In the voltage reference circuit 100, the drain currents of transistors Q3 and Q5 are defined by $$I_D = I_0 \frac{W}{L} e^{\frac{V_{GS}-V_{th}}{nV_T}} \left[1 - e^{\frac{-V_{DS}}{V_T}}\right],$$

where $I_0$ is a characteristic current, $$\frac{W}{L}$$

is a channel length (L) to width (W) ratio, $V_{GS}$ is a gate to source voltage, $V_{th}$ is a threshold voltage, $V_{DS}$ is a drain to source voltage, and $V_T$ is a thermal voltage of the transistor Q3. The parameter n is a weak inversion slope factor defined by $$n = 1 + \frac{C_D}{C_{ox}},$$

where $C_D$ is a depletion capacitance. Neglecting a $V_{DS}$ dependency for $V_{DS} >> V_T$, the drain current of transistor Q3 is defined by $$I_D = I_0 \frac{W}{L} e^{\frac{V_{GS}-V_{th}}{nV_T}}.$$

Using the factor $$\mu C_{ox} \frac{W}{L}$$

(e.g., also known as the transconductance coefficient β) as the drain current limit for weak inversion, the drain current of transistor Q3 is defined by $$I_D \leq \mu C_{ox} \frac{W}{L} V_T^2 \text{ or } I_D \leq \beta V_T^2.$$

A voltage across the resistor R0 may be derived as $V_{R0}=V_{GS4}-V_{GS5}$. The gate to source voltage can be expressed $$V_{GS} = nV_T \ln\left(\frac{I_D}{I_0 \frac{W}{L}}\right) + V_{th}.$$

Assuming substantially identical transistors Q4 and Q5, with different width and without body effect and equal drain currents yields $$V_{R1} = nV_T \ln\left(\frac{W_5}{W_4} \cdot \frac{L_4}{L_5}\right).$$

The current through the resistor R0, transistor Q3, and transistor Q4 equates $$I_{R0} = I_{Q3} = I_{Q4} = \frac{V_{R0}}{R_0} = \frac{nV_T}{R_0} \ln\left(\frac{W_5}{W_4} \cdot \frac{L_4}{L_5}\right).$$

Based on this current and assuming that $I_B$=IB1=IB2=IB3, the VREF is defined as $V_{REF}=V_{PTAT}+V_{GS4}-V_{GS3}$, which may be simplified as $$V_{REF} = V_T \ln\left(1 + \frac{\frac{W_6}{L_6}}{\frac{W_7}{L_7}}\right) + V_{GS4} - V_{GS3} \text{ or } V_{REF} =$$

$$V_T \ln\left(1 + \frac{\frac{W_6}{L_6}}{\frac{W_7}{L_7}}\right) + n_4 V_T \ln\left(\frac{I_B}{I_{04} \frac{W_4}{L_4}}\right) + V_{th4} - n_3 V_T \ln\left(\frac{I_B}{I_{03} \frac{W_3}{L_3}}\right) + V_{th3}.$$

Assuming subthreshold slopes of transistors Q3 and Q4 to be approximately equal to n, the VREF is ultimately defined as $$V_{REF} = V_T \ln\left(1 + \frac{\frac{W_6}{L_6}}{\frac{W_7}{L_7}}\right) + nV_T \ln\left(\frac{I_{03} \frac{W_3}{L_3}}{I_{01} \frac{W_4}{L_4}}\right) + V_{th4} - V_{th3}.$$

The preceding equation for VREF shows that VREF only depends on transistor properties and aspect ratios, while remaining independent from the resistance of resistor R0.

Figure 2:
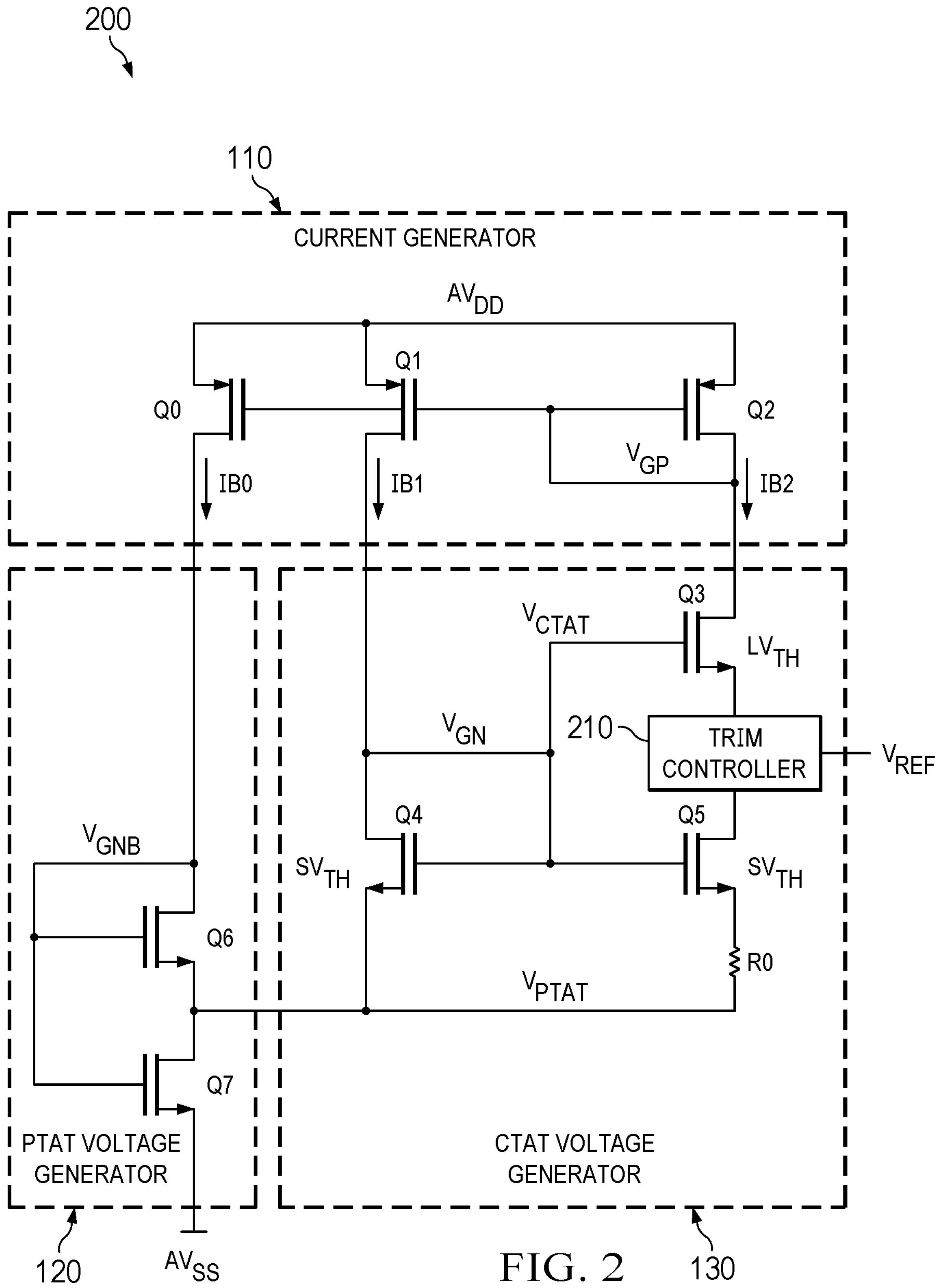
FIG. 2 is a circuit diagram illustrating a voltage reference circuit including a trim controller, in accordance with one or more embodiments.

FIG. 2 is a circuit diagram of a voltage reference circuit 200 in accordance with one or more embodiments. The voltage reference circuit 200 is configured to generate a VREF that is relatively unaltered by temperature changes in the voltage reference circuit 200 within a particular temperature range. “Relatively unaltered” refers to a value of VREF that is +/−10 ppm from a target voltage when the voltage reference circuit 200 is within a particular temperature range. In some embodiments, the voltage reference circuit 200 includes all the functionality and electronic components described with reference to voltage reference circuit 100. In the example of FIG. 2, the voltage reference circuit 200 of FIG. 2 includes the current generator 110 which includes the transistors Q0-Q3 coupled together as described above. The PTAT voltage generator 120 also includes transistors Q6 and Q7 coupled together. The drains of the transistors Q0 and Q6 are coupled together. The CTAT voltage generator 130 includes the transistors Q3-Q5, which are coupled together. The drain of the transistor Q1 is coupled to the drain of the transistor Q4. The drain of the transistor Q2 is coupled to the drain of the transistor Q3. The source of the transistors Q4 and Q5 are coupled to one another and the source of the transistor Q6 and the drain of the transistor Q7.

In FIG. 2, the voltage reference circuit 200 includes a trim controller 210 including at least two terminals coupled to the source of the transistor Q3 and the drain of the transistor Q5, respectively. Further, the trim controller 210 is configured to generate an adjusted version of the VREF as an output. The adjusted version of the VREF includes an adjusted TC. The trim controller 210 adjusts the VREF (up or down) by modifying the TC when the combination of the positive TC from the transistor Q5 and the negative TC from the transistor Q3 is not equal to zero. The TC may be a value other than zero based on manufacturing process variations of all transistors. This version of the VREF is the same described in reference to FIG. 1, with the aforementioned additional adjustment. Because the voltage of VREF is solely dependent on the properties of the transistors Q3 and Q4 in the CTAT voltage generator 130, the equation VREF remains the same with the VREF being ultimately defined as $$V_{REF} = V_T \ln\left(1 + \frac{\frac{W_6}{L_6}}{\frac{W_7}{L_7}}\right) + nV_T \ln\left(\frac{I_{03} \frac{W_3}{L_3}}{I_{01} \frac{W_4}{L_4}}\right) + V_{th4} - V_{th3}.$$

Figure 3:
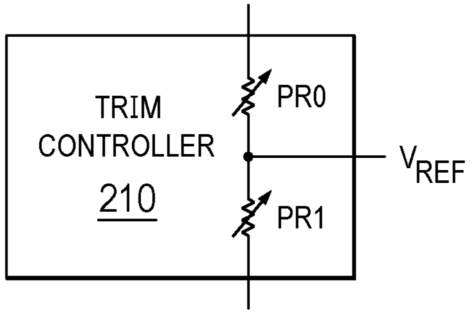
FIG. 3 is a circuit diagram illustrating an example implementation of the trim controller, in accordance with one or more embodiments.

FIG. 3 shows an example implementation of the trim controller 210 in accordance with one or more embodiments. In this example, the trim controller 210 includes at least two programmable resistors PR0 and PR1. Each of these resistors may be coupled to one another at a respective terminal where the value of the VREF may be obtained. The other terminals of the resistors RP0 and RP1 may be coupled to the source of the transistor Q3 and the drain of the transistor Q5, respectively. The two programmable resistors RP0 and RP1 may be two variable resistors configured to reduce the TC combination to zero based on a particular configuration. The two programmable resistors RP0 and RP1 may include pre-defined values selected based on a specific trimming application. The programmable resistors RP0 and RP1 may be two sets of resistors configured to be programmed using programmable switches. The values of the programmable switches may be programmed digitally to allocate a particular resistance for each of the programmable resistors RP0 and RP1. The resistance values of the two programmable resistors RP0 and RP1 may be set while the voltage reference circuit 100 is in an OFF state (e.g., when AVDD and AVSS are equal to zero).

Figure 4:
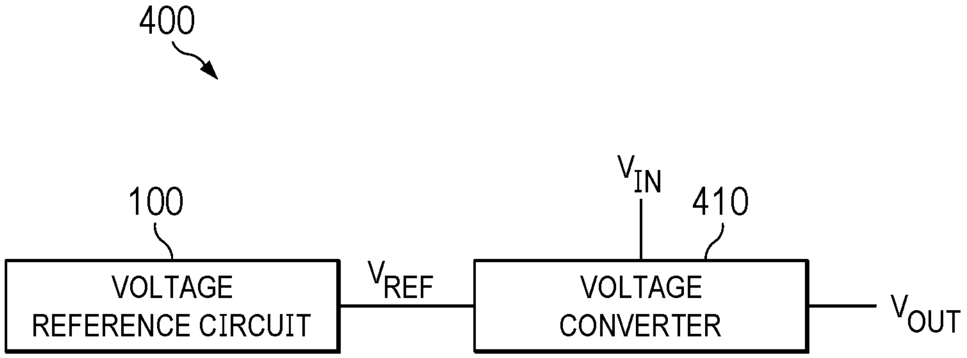
FIG. 4 is a block diagram illustrating a system including the voltage reference circuit, in accordance with one or more embodiments.

FIG. 4 shows a system 400 for an electronic device in accordance with one or more embodiments. The system 400 includes the voltage reference circuit 100 coupled to a voltage converter 410. The voltage reference circuit 100 provides the VREF as an input to the voltage converter 410. The voltage converter 410 may be configured to provide an output voltage VOUT based on an input voltage VIN and the VREF. In the example of FIG. 4, the voltage reference circuit 100 provides the VREF as a reference value to a Power on Reset (POR) stage or start up stage to the system 400. In the system 400, the voltage converter 410 uses the VREF to determine whether a precise voltage is available for use from a power supply. The voltage converter 410 may compare the VREF to the precise voltage until the voltages are equal. After the voltages are equal, the voltage converter 410 may be triggered to use power provided from the power supply to perform voltage conversion operations. Instead of the voltage reference circuit 100, the system 400 may include the voltage reference circuit 200 including the trim controller 210 described in reference to FIGS. 2 and 3.

The voltage converter 410 may be a Direct Current (DC)/DC converter configured as an isolated voltage converter. As described above, the VREF may define a voltage from the power supply at which the voltage converter 410 starts providing power from a primary coil to a secondary coil. As described above, the voltage reference circuit 100 maintains an approximately constant value of VREF within the particular temperature range.

In the description, unless otherwise stated, "about," "approximately" or "substantially" preceding a parameter means being within +/−10 percent of that parameter.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit ("IC") package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-channel field effect transistor ("PFET") may be used in place of an n-channel field effect transistor (NFET) with little or no changes to the circuit. Furthermore, other types of transistors may be used (such as bipolar junction transistors ("BJTs")).

A transistor includes three terminals—a control terminal and a pair of current terminals. In the case of a field effect transistor, the control terminal is the gate, and the current terminals are the drain and source. In the case of a bipolar junction transistor, the control terminal is the base, and the current terminals are the emitter and collector.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Modifications are possible in the described embodiments, and other embodiments are possible, within the scope of the claims.

What is claimed is:

1. A circuit, comprising:

a current generator coupled to a first voltage source and configured to:

generate a first current, and mirror the first current as a second current and a third current;

a proportional to absolute temperature ("PTAT") voltage generator coupled to the current generator and a second voltage source, the PTAT voltage generator configured to:

receive the second current from the current generator, and generate a third voltage based on the second current; and a complementary to absolute temperature ("CTAT") voltage generator coupled to the current generator and to the PTAT voltage generator, the CTAT voltage generator configured to:

receive the first current and the third current from the current generator, and generate a reference voltage based on the first current, the second current, and the third voltage, wherein:

the current generator includes a first field effect transistor (FET), a second FET, and a third FET, the first FET having a first gate, a first source, and a first drain, the second FET having a second gate, a second source and a second drain, and the third FET having a third gate, a third source, and a third drain;

the first FET configured to generate the first current;

the second FET and the third FET configured to mirror the first current as the second current and the third current, respectively;

the first source, the second source, and the third source coupled together and to the first voltage source;

the first gate, the second gate, and the third gate connected to one another and the first drain;

the second drain is connected to a FET in the PTAT voltage generator; and the first drain and the third drain are connected to a transistor in the CTAT voltage generator.

2. The circuit of claim 1, wherein:

the PTAT voltage generator includes a fourth field effect transistor (FET) and a fifth FET;

the fourth FET includes:

a fourth drain coupled to a FET in the current generator, a fourth gate coupled to the first drain, and a fourth source coupled to a FET in the CTAT voltage generator;

the fifth FET includes:

a fifth drain coupled to the first source and the FET in the CTAT voltage generator, a fifth gate coupled to the first drain, the first gate, and the FET in the current generator, and a fifth source coupled to the second voltage source; and the third voltage is a Voltage proportional to absolute temperature ("VPTAT").

3. The circuit of claim 1, wherein:

the CTAT voltage generator includes a fourth field effect transistor (FET), a fifth FET, a sixth FET, and a resistor;

the fourth FET includes:

a fourth drain coupled to a FET in the current generator, a fourth gate coupled to the fourth drain and another FET in the current generator, and a fourth source coupled to the fifth FET;

the fifth FET includes:

a fifth drain coupled to the fourth gate and the FET in the current generator, a fifth gate coupled to the fifth drain, the fourth gate, and the another FET in the current generator, and a fifth source coupled to a FET in the PTAT voltage generator;

the sixth FET includes:

a sixth drain coupled to the fourth drain, a sixth gate coupled to the fourth gate, the fifth drain, the fifth gate, and the another FET in the current generator, and a sixth source coupled to a first resistor terminal of the resistor;

the resistor includes the first resistor terminal coupled to the sixth source and a second resistor terminal coupled to the fifth source and the FET of the PTAT voltage generator; and the reference voltage is a voltage at the sixth drain.

4. The circuit of claim 3, wherein:

the sixth FET includes a first threshold voltage and the fourth FET includes a second threshold voltage, the first threshold voltage being higher than the second threshold voltage.

5. The circuit of claim 3, wherein:

the circuit is configured to keep the reference voltage within +/−10 parts per million ("ppm") from a target voltage when the circuit operates within a temperature range of-55 degrees Celsius to 180 degrees Celsius, inclusive.

6. The circuit of claim 1, wherein:

the CTAT voltage generator includes a fourth field effect transistor (FET), a fifth FET, a sixth FET, a resistor, and a trim controller;

the fourth FET includes:

a fourth drain coupled to a FET in the current generator, a fourth gate coupled to the fourth drain and another FET in the current generator, and a fourth source coupled to the trim controller via a first trim terminal;

the fifth FET includes:

a fifth drain coupled to the fourth gate and the FET in the current generator, a fifth gate coupled to the fifth drain, the fourth gate, and the another FET in the current generator, and a fifth source coupled to a FET in the PTAT voltage generator;

a sixth FET includes:

a sixth drain coupled to a second trim terminal of the trim controller, a sixth gate coupled to the fourth gate, the fifth drain, the fifth gate, and the another FET in the current generator, and a sixth source coupled a first resistor terminal of the resistor;

the resistor includes a first resistor terminal coupled to the sixth source and a second resistor terminal coupled to the fifth source and the FET of the PTAT voltage generator;

the trim controller includes the first trim terminal coupled to the fourth source, the second trim terminal coupled to the sixth drain, and a third terminal configured to output the reference voltage, the trim controller being configured to adjust the reference voltage; and the circuit is configured to keep the reference voltage within +/−10 parts per million ("ppm") from a target voltage when the circuit is within a temperature range.

7. A circuit, comprising:

a first transistor including:

a first current terminal coupled to a first voltage source, a first control terminal, and a second current terminal coupled to the first control terminal;

a second transistor including:

a third current terminal coupled to the second current terminal, a second control terminal, and a fourth current terminal; and a third transistor including:

a fifth current terminal coupled to the fourth current terminal, a third control terminal coupled to the second control terminal, and a sixth current terminal, wherein a voltage at the fifth current terminal is a reference voltage, and the circuit is configured to keep the reference voltage within +/−10 parts per million ("ppm") from a target voltage when the circuit is within a temperature range.

8. The circuit of claim 7, wherein:

a voltage at the second control terminal is a voltage complementary to absolute temperature ("VCTAT").

9. The circuit of claim 8, further comprising:

a fourth transistor including:

a seventh current terminal coupled to the first voltage source, a fourth control terminal coupled to the first control terminal, and an eighth current terminal;

a fifth transistor including:

a ninth current terminal coupled to the first voltage source, a fifth control terminal coupled to the first control terminal and the fourth control terminal, and a tenth current terminal, wherein the first transistor is configured to generate a first current, and wherein the fourth transistor and the fifth transistor are configured to mirror the first current into a second current and a third current, respectively.

10. The circuit of claim 9, wherein:

a sixth transistor including:

an eleventh current terminal coupled to the eighth current terminal, a sixth control terminal coupled to the eleventh current terminal and the eighth current terminal, and a twelfth current terminal; and a seventh transistor including:

a thirteenth current terminal coupled to the twelfth current terminal, a seventh control terminal coupled to the sixth control terminal, the eleventh current terminal, and the eighth current terminal, and a fourteenth current terminal coupled to a second voltage source, a voltage at the thirteenth current terminal is a voltage proportional to absolute temperature ("VPTAT").

11. The circuit of claim 10, wherein:

the reference voltage has a temperature coefficient that is approximately zero within a particular temperature range.

12. The circuit of claim 10, wherein:

an eighth transistor including:

a fifteenth current terminal coupled to the second control terminal, the third control terminal, and the tenth current terminal, an eighth control terminal coupled to the fifteenth current terminal, the second control terminal, the third control terminal, and the tenth current terminal, and a sixteenth current terminal coupled to the twelfth current terminal, and the thirteenth current terminal; and a resistor including:

a first resistor terminal coupled to the fourth current terminal, and a second resistor terminal coupled to the sixteenth current terminal, the twelfth current terminal, and the thirteenth current terminal.

13. The circuit of claim 12, wherein:

the second transistor includes a first threshold voltage and the third transistor includes a second threshold voltage, the first threshold voltage being higher than the second threshold voltage.

14. A circuit, comprising:

a first transistor including:

a first current terminal configured to receive a first current, a first control terminal including a voltage complementary to absolute temperature ("VCTAT") including a first temperature coefficient, and a second current terminal;

a second transistor including:

a third current terminal coupled to the second current terminal, a second control terminal coupled to the first control terminal, and a fourth current terminal; and a resistor including:

a first resistor terminal coupled to the fourth current terminal, and a second resistor terminal including a voltage proportional to absolute temperature ("VPTAT") including a second temperature coefficient, wherein a voltage at the third current terminal is a reference voltage, and the circuit is configured to keep the reference voltage within +/−10 parts per million ("ppm") from a target voltage when the circuit operates within a particular temperature range.

15. The circuit of claim 14, wherein:

the first transistor includes a first threshold voltage and the second transistor includes a second threshold voltage, the first threshold voltage being higher than the second threshold voltage.

16. The circuit of claim 14, wherein:

the reference voltage has a temperature coefficient that is approximately zero within the particular temperature range, and the temperature coefficient is approximately zero based on a combination of the first temperature coefficient and the second temperature coefficient.

* * * * *